No. 777,349. PATENTED DEC. 13, 1904.
J. H. MITCHELL.
DOUGH SHEETING AND LAPPING MACHINE.
APPLICATION FILED FEB. 20, 1904.
NO MODEL. 5 SHEETS—SHEET 1.

No. 777,349. PATENTED DEC. 13, 1904.
J. H. MITCHELL.
DOUGH SHEETING AND LAPPING MACHINE.
APPLICATION FILED FEB. 20, 1904.
NO MODEL. 5 SHEETS—SHEET 3.

WITNESSES:
INVENTOR
James H. Mitchell
BY
*his* ATTORNEY.

No. 777,349. PATENTED DEC. 13, 1904.
J. H. MITCHELL.
DOUGH SHEETING AND LAPPING MACHINE.
APPLICATION FILED FEB. 20, 1904.
NO MODEL. 5 SHEETS—SHEET 4.
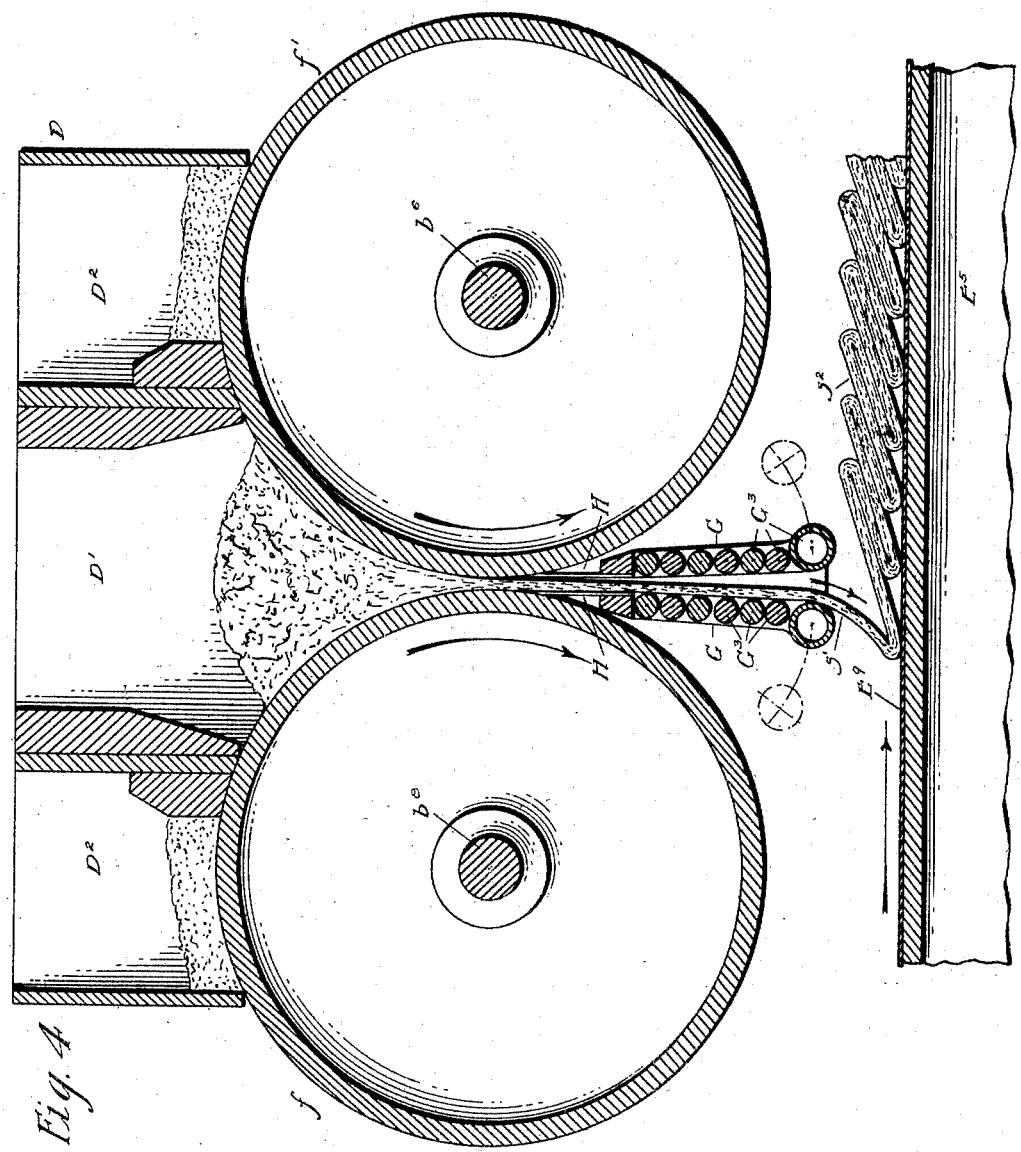

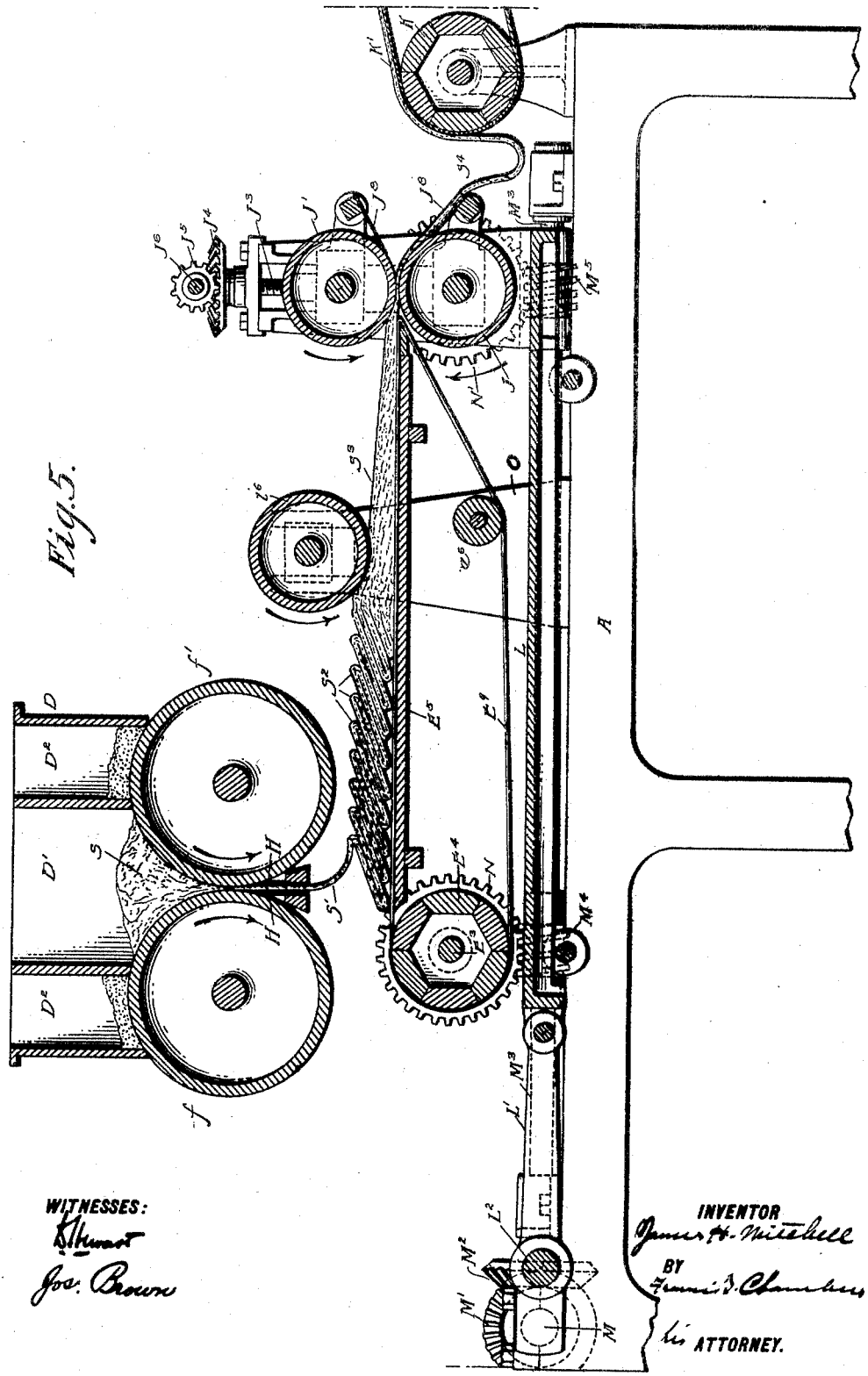

No. 777,349. Patented December 13, 1904.

UNITED STATES PATENT OFFICE.

JAMES H. MITCHELL, OF PHILADELPHIA, PENNSYLVANIA.

DOUGH SHEETING AND LAPPING MACHINE.

SPECIFICATION forming part of Letters Patent No. 777,349, dated December 13, 1904.

Application filed February 20, 1904. Serial No. 194,467. (No model.)

*To all whom it may concern:*

Be it known that I, JAMES H. MITCHELL, a citizen of the United States of America, residing in the city and county of Philadelphia, in the State of Pennsylvania, have invented a certain new and useful Improvement in Dough Sheeting and Lapping Machines, of which the following is a true and exact description, reference being had to the accompanying drawings, which form a part thereof.

My invention relates to mechanism for working dough, and has for its object to provide mechanism whereby sheeted dough may be delivered in a folded or lapped condition, the said lapped sheet of dough being afterward resheeted, so as to afford a comparatively thin sheet of dough of a highly-laminated character.

In carrying my invention into effect I make use of sheeting-rolls, which may be of ordinary character, and a traveling apron or carrier upon which the sheet of dough is deposited as it comes from the sheeting-rolls; and the leading feature of novelty of my invention consists in providing mechanical means for guiding the dough onto the apron or carrier in such a way that it is delivered thereon in lapped folds.

The nature of my invention and the mechanism which I have devised for carrying it into practical effect will be best understood as described in connection with the accompanying drawings, in which—

Figure 1:
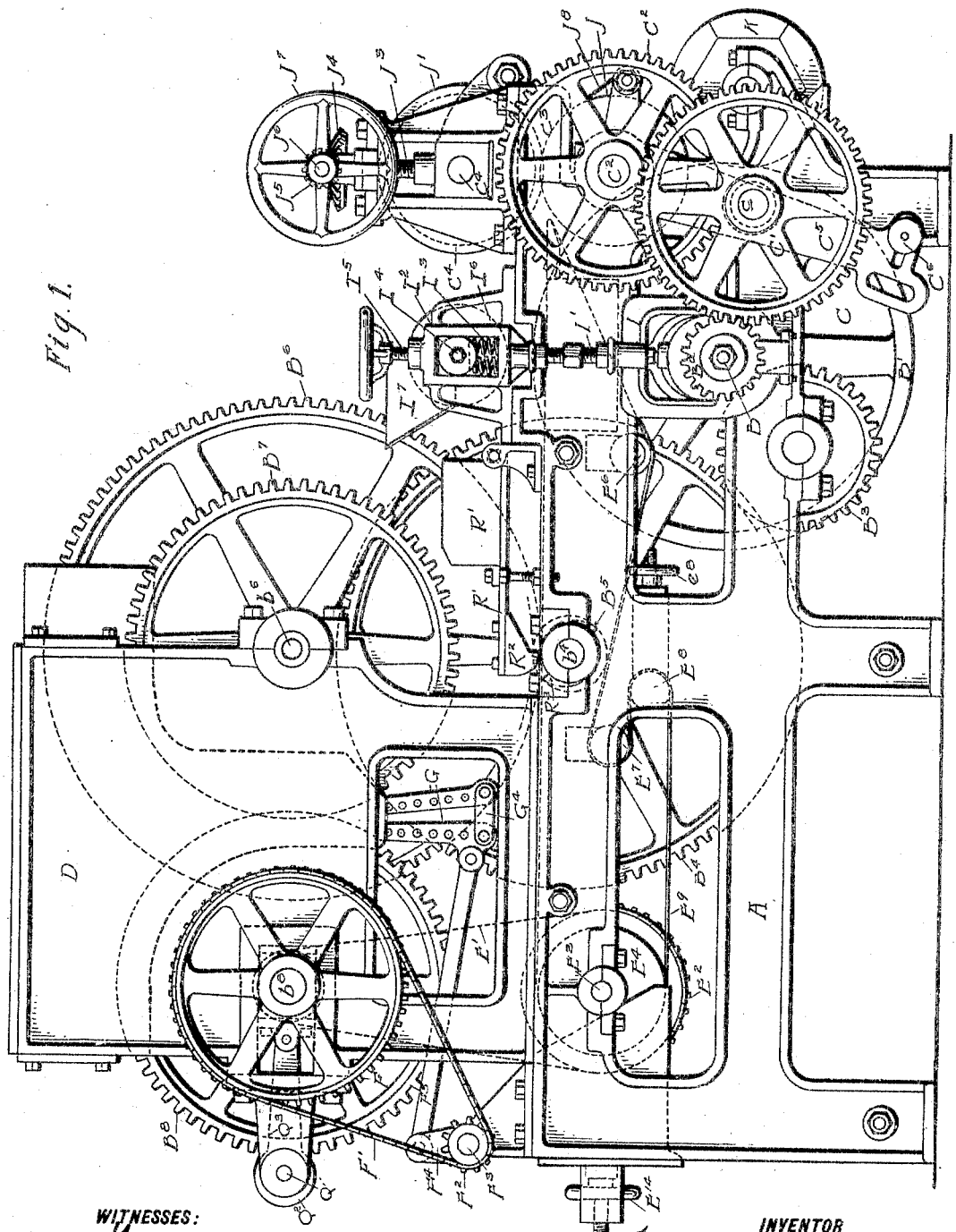
Figure 2:
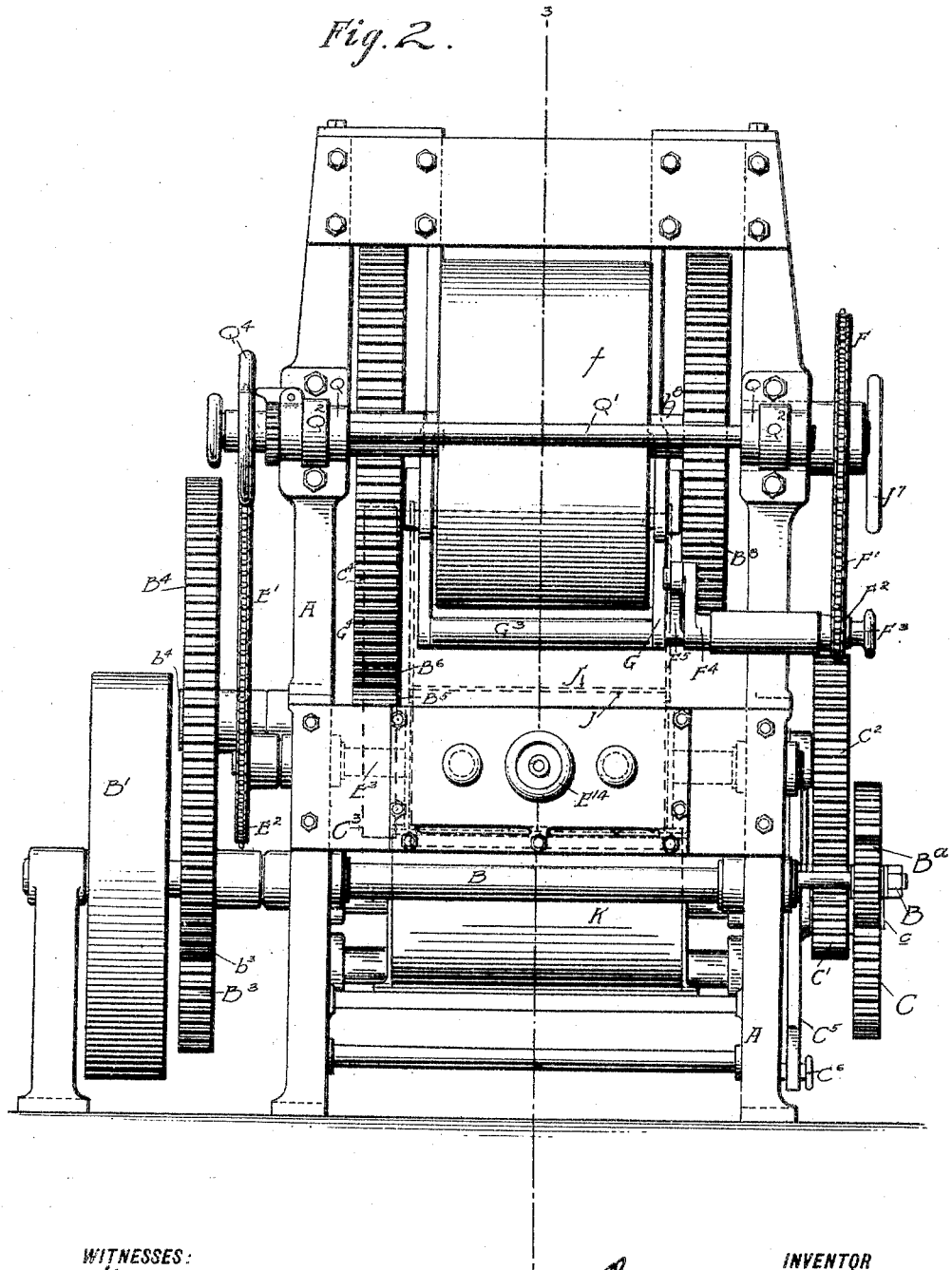
Figure 3:
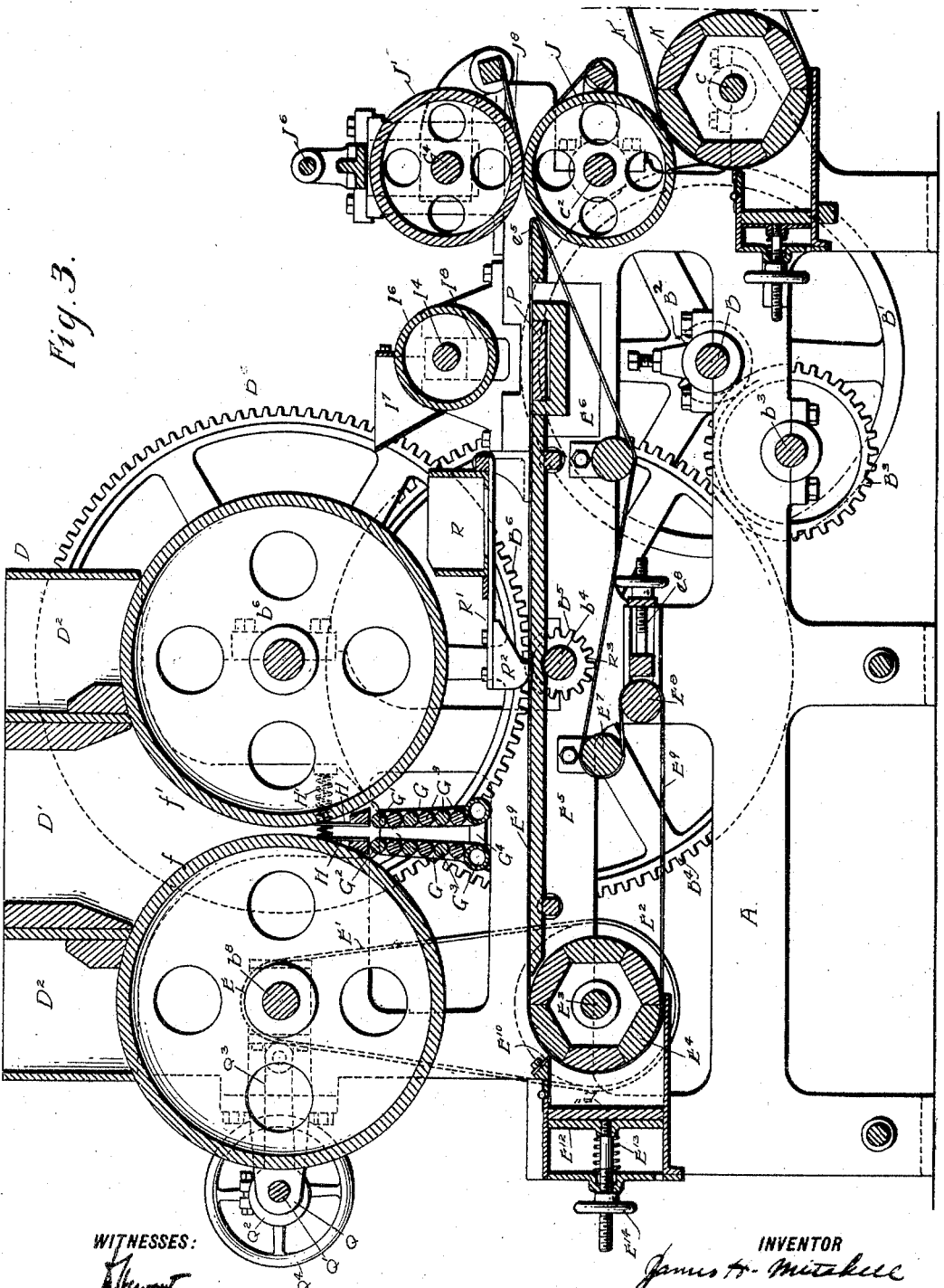

Figure 1 is a side elevation of a machine embodying my invention in what I consider to be its most practicable form. Fig. 2 is an end elevation of the said machine; Fig. 3, a central longitudinal section on the line 3 3 of Fig. 2; Fig. 4, an enlarged cross-sectional view of the sheeting-rolls, the carrier or apron, and the oscillating guide which I prefer to use for effecting the lapping of the dough upon the apron. The said view also shows the dough and the manner in which it is delivered to the apron. Fig. 5 is a longitudinal sectional elevation of a modified form of machine, showing another mechanical device for effecting the lapping delivery of the sheet upon the carrier.

Referring first to the construction shown in Figs. 1 to 4, A is the frame of the machine; B, the main driving-shaft; B', the driving-pulley. The main driving-shaft has upon it the gear-wheel $B^2$, (see Fig. 3,) which engages and drives the intermediate gear $B^3$, which in turn engages and drives the gear-wheel $B^4$, secured to the shaft $b^4$, to which shaft is also secured the smaller gear $B^5$, which engages and drives the gear-wheel $B^6$, secured to the shaft $b^6$, to which shaft is also secured the gear $B^7$, which engages and drives the gear $B^8$ on the shaft $b^8$. The gear-wheel on shaft 8 engages and drives the gear-wheel C, secured to the shaft $c$, which in turn is secured to the swinging frame, (indicated at $C^5$,) $C^6$ indicating means by which this swinging frame is adjusted and secured in position. Another gear-wheel (indicated at C') is also secured on the shaft $c$ and engaged with the gear $C^2$ on the shaft $c^2$, said shaft also supporting the gear (indicated at $C^3$) which engages and drives the gear (indicated at $C^4$) on the adjustable shaft $c^4$.

$f$ and $f'$ are the sheeting-rolls secured to the shafts $b^6$ and $b^8$, the shaft $b^6$ being rigidly secured to the frame of the machine and the shaft $b^8$ supported in a slide, so as to be horizontally adjustable to vary the distance between the rolls $f$ and $f'$. The adjusting device is shown in Figs. 1, 2, and 3 and consists of a shaft Q', supported on the stationary brackets Q and supporting eccentrics on which are situated the eccentric-straps $Q^2$, which by means of rods $Q^3$ connect with and adjust the bearings for the shaft $b^8$.

D is a casing situated above the rolls $f$ and $f'$, the central part D' forming a dough-hopper, while the compartments $D^2$ $D^2$ are charged with flour, so as to constantly impart a covering of flour to the sheeting-rolls and prevent the dough sticking to them.

E is a sprocket-wheel secured to the shaft $b^8$, connecting, through a sprocket-chain E', with a sprocket-wheel $E^2$, secured to the shaft $E^3$, to which shaft is also secured the apron or carrier-drum $E^4$.

$E^5$ is a platform running practically tangent to the drum $E^4$, its outer end $e^5$ being rounded, as shown.

$E^6$, $E^7$, and $E^8$ are guide and tension rolls, the roll E⁸ being adjustably supported, as indicated at e⁸.

E⁹ is an apron or carrier which passes over and is actuated by the drum E⁴, then passes over the platform E⁵, turning back over its outer end e⁵ and passing over the guide and tension rolls again to the drum.

E¹⁰ (see Fig. 3) is a scraper, and E¹¹ a flour-charged box, the flour being pressed up against the apron while it passes over the drum E⁴ by the plunger E¹², partly acted on by the springs E¹³ and partly by the adjusting-screw E¹⁴.

G G, together with the connecting-bars G⁴, securing them together at bottom, constitute the frame of the oscillating sheet-folder which I prefer to employ, parallel frame G² supporting a series of rolls G³ and each side of the frame being pivotally secured at the upper ends, (indicated at G' G'.) As shown, the oscillating sheet-folder is actuated by the mechanism best shown in Fig. 1, a sprocket-wheel F being secured to the shaft b⁸ and connected by a sprocket-chain F' with a sprocket-wheel F², secured on a shaft F³, which in turn has secured to it a crank F⁴, which is by means of a connecting-rod F⁵ connected to the frame of the oscillating folding device.

H H are scrapers working in connection with the rolls f f', H' indicating springs acting to press the scrapers against the rolls.

I have shown in the drawings coöperating devices for working and sheeting the folded dough which in themselves are not new and form no part of my present invention. Thus I have shown at P a supplemental table interposed in the table E⁵ and over which the carrier E⁹ passes, and immediately above this table P is the dough-working roll I⁶, secured to a shaft I⁴, which has bearings working in the housing I⁸ (indicated in Fig. 3) and caused to work up and down by an eccentric situated on the shaft B and working in connection with an eccentric-ring I, which connects, through an adjustable rod I', with the frame I², which pass over the ends of the shaft I⁴, supporting said ends on springs, as indicated at I³, I⁵ indicating an adjusting-screw for varying the stroke of the working roll, and I⁷ a flour-box of usual character. I have also shown a pair of sheeting-rolls J and J' arranged to receive the sheet of sheeted and folded dough from the apron E⁹, these rolls being secured to the shafts c² and c⁴ and the upper one and its shaft c⁴ being made adjustable to vary the thickness of the sheet, the adjustment being effected by connecting the bearings of the shaft c⁴ with screws J³, which are turned through bevel-gears J⁴, secured to their upper ends by a shaft J⁶, actuated by a hand-wheel J⁷, having secured to it bevel-gears J⁵.

J⁸ indicates scrapers by which the sheet of dough is removed from the rolls J' and J and delivered to a traveling belt K', running over a drum K.

R is a flour-box by which the upper face of the folded dough is dusted with flour, the box being a shaker supported on the arm R', which in turn has a block R² on its end which rests upon the cams R³, fastened to shaft b⁴.

In the modified construction shown in Fig. 5 the oscillating guide working between the sheet-rolls f and f' and the apron E⁹ is dispensed with and the folding of the sheet of dough is effected by giving to the carrier or apron in addition to its vertical motion an oscillating to-and-fro motion, by which it is made to serve in addition to its function as a transporting device the additional function of a folding or lapping device. In this construction the drum E⁴ and its shaft E³, as well as the table E⁵, are supported on a longitudinally-movable platform L, which is caused to move back and forward by a crank L², secured to a driving-shaft M and connecting to the end of the slide L by a connecting-rod L'. I have also indicated in this design a shaft M³, actuated through bevel-gears M² and M' by the shaft M and to which shaft are keyed worms M⁴ and M⁵, the worms being free to move longitudinally on the shaft to which they are keyed and being engaged with the slide L, so as to move with it. The worm M⁴ engages and drives a gear N, secured to the shaft E³, and the worm M⁵ engages and drives a bevel-gear N', secured to the shaft of the lower roll J, which in turn is connected with and drives the shaft of the upper roll J', as in the other construction. In place of having a vertically-reciprocating working roll I have shown in this last modification a working roll i⁶ secured to stationary brackets O. I have indicated the dough in the hopper D' at S, the sheet delivered from the sheeting-rolls f and f' at S', the layers delivered to the traveling apron S², and (see Fig. 5) the partly-worked-down layers at S³, while the final sheet delivered from the rolls J and J' is indicated at S⁴.

Having now described my invention, what I claim as new, and desire to secure by Letters Patent, is—

1. A dough sheeting and lapping device having in combination means for sheeting dough, a traveling apron to receive the sheeted dough, means whereby the apron is caused to move forward while the dough is fed to it and means acting to deliver the dough on the apron in lapped folds.

2. A dough sheeting and lapping device having in combination means for sheeting dough, a traveling apron to receive the sheeted dough, means whereby the apron is caused to move forward while the dough is fed to it, means acting to deliver the dough on the apron in lapped folds and rolls other than those feeding the sheet to the apron acting to again sheet the lapped folds of dough delivered to the apron.

3. A dough sheeting and lapping device consisting of a pair of sheeting-rolls in combination with a traveling apron arranged to receive the sheeted dough, means whereby the apron is caused to move forward while the dough is fed to it and an oscillating guide through which the sheet of dough passes from the rolls to the apron and whereby it is delivered upon the apron in lapped folds.

4. A dough sheeting and lapping device consisting of a pair of sheeting-rolls in combination with a traveling apron arranged to receive the sheeted dough, and an oscillating guide made up of suitably-supported rollers through which the sheet of dough passes from the rolls to the apron and whereby it is delivered upon the apron in lapped folds.

JAMES H. MITCHELL.

Witnesses:
CHAS. F. MYERS,
D. STEWART.